United States Patent
Iwasaki et al.

(10) Patent No.: US 8,136,900 B2
(45) Date of Patent: Mar. 20, 2012

(54) INKJET RECORDING APPARATUS

(75) Inventors: Michio Iwasaki, Hitachi (JP); Masahiko Sakuraba, Hitachi (JP); Nobuhiro Harada, Hitachi (JP); Shinichi Kobayashi, Mito (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 371 days.

(21) Appl. No.: 12/368,660

(22) Filed: Feb. 10, 2009

(65) Prior Publication Data

US 2010/0066778 A1 Mar. 18, 2010

(30) Foreign Application Priority Data

Sep. 17, 2008 (JP) ................. 2008-237323

(51) Int. Cl.
*B41J 29/38* (2006.01)
*B41J 2/02* (2006.01)
*B41J 2/07* (2006.01)

(52) U.S. Cl. .............. 347/5; 347/9; 347/19; 347/73; 347/74; 347/75; 347/76; 347/77; 347/82; 347/83; 713/168; 713/169; 713/171

(58) Field of Classification Search .............. 347/73, 347/74; 713/168, 171
See application file for complete search history.

(56) References Cited

U.S. PATENT DOCUMENTS

| 3,786,517 | A | * | 1/1974 | Krause ........................... 347/74 |
| 6,260,946 | B1 | | 7/2001 | Hori |
| 2005/0198243 | A1 | * | 9/2005 | Snible et al. ................. 709/223 |
| 2005/0280838 | A1 | | 12/2005 | Kanai et al. |
| 2006/0045595 | A1 | | 3/2006 | Hanaoka |
| 2006/0206720 | A1 | * | 9/2006 | Harada et al. ................ 713/182 |
| 2008/0172715 | A1 | * | 7/2008 | Geiger et al. .................... 726/1 |

FOREIGN PATENT DOCUMENTS

| JP | 2003-034063 | 2/2003 |
| JP | 2005-125751 | 5/2005 |
| JP | 2005-199432 | 7/2005 |

* cited by examiner

*Primary Examiner* — Ryan Lepisto
(74) *Attorney, Agent, or Firm* — Kilpatrick Townsend & Stockton LLP

(57) ABSTRACT

An inkjet recording apparatus includes a nozzle, a charging electrode, a deflecting electrode, a storage device, and an authentication device. The nozzle atomizes a supplied ink into ink particles by exciting and ejecting the supplied ink. The charging electrode electrically charges the ink particles. The deflecting electrode forms an electric field that deflects the ink particles electrically charged. The storage device storing therein a program(s) that implements a predetermined printing function(s). The predetermined printing function(s) becomes executable upon connection of an authentication key to the authentication device.

3 Claims, 11 Drawing Sheets

FIG.2

| | 200 | | |
|---|---|---|---|
| FUNCTION SELECTION SCREEN | | | |
| 01 NUMBER OF PRINT ROWS | TWO ROW | THREE ROWS | FOUR ROWS |
| 02 PRINTING SPEED | | | |
| >ONE ROW | f/2 | f/1 | f/1 |
| >TWO ROWS | f/2 | f/1.5 | f/1 |
| >THREE ROWS | (f/2) | f/1.66 | f/1 |
| >FOUR ROWS | (f/3) | (f/2) | f/1 |
| 03 SPECIAL PRINTING | | | |
| >LONGITUDINAL PRINTING | INVALID | VALID | VALID |
| >REVERSE PRINTING | INVALID | VALID | VALID |
| >2D BARCODE | INVALID | INVALID | VALID |
| >PRINT PITCH | INVALID | INVALID | VALID |
| 04 PRINT DATA | | | |
| >DATA SIZE | 48 | 150 | 2000 |
| >DATA LENGTH | 120 | 240 | 1000 |
| 05 CALENDER/COUNT | | | |
| >NUMBER OF CALENDARS | 2 | 8 | |
| >SHIFT CODE | INVALID | VALID | |
| >TIME COUNT | INVALID | VALID | |
| >CALENDAR CONVERSION | 48 | 99 | |
| >COUNTER VALUE | 2 | 8 | |

NUMBER OF UPGRADABLE PHASES    9/9

Cancel

FUNCTION SELECTION SCREEN

| | | +1 → | |
|---|---|---|---|
| 01 NUMBER OF PRINT ROWS | TWO ROW | THREE ROWS | FOUR ROWS |

02 PRINTING SPEED

| | | +1 → | |
|---|---|---|---|
| >ONE ROW | f/2 | f/1 | f/1 |
| >TWO ROWS | f/2 | f/1.5 | f/1 |
| >THREE ROWS | (f/2) | f/1.66 | f/1 |
| >FOUR ROWS | (f/3) | (f/2) | f/1 |

03 SPECIAL PRINTING

| | | | |
|---|---|---|---|
| >LONGITUDINAL PRINTING | INVALID | VALID | VALID |
| >REVERSE PRINTING | INVALID | VALID | VALID |
| >2D BARCODE | INVALID | INVALID | VALID |
| >PRINT PITCH | INVALID | INVALID | VALID |

04 PRINT DATA

| | | | |
|---|---|---|---|
| >DATA SIZE | 48 | 150 | 2000 |
| >DATA LENGTH | 120 | 240 | 1000 |

05 CALENDER/COUNT

| | | | |
|---|---|---|---|
| >NUMBER OF CALENDARS | 2 | 8 | |
| >SHIFT CODE | INVALID | VALID | |
| >TIME COUNT | INVALID | VALID | |
| >CALENDAR CONVERSION | 48 | 99 | |
| >COUNTER VALUE | 2 | 8 | |

NUMBER OF UPGRADABLE PHASES    0/2

Cancel

FUNCTION SELECTION SCREEN

| | | | |
|---|---|---|---|
| 01 NUMBER OF PRINT ROWS | TWO ROW | THREE ROWS | FOUR ROWS |
| 02 PRINTING SPEED | | | |
| >ONE ROW | f/2 | f/1 | f/1 |
| >TWO ROWS | f/2 | f/1.5 | f/1 |
| >THREE ROWS | (f/2) | f/1.66 | f/1 |
| >FOUR ROWS | (f/3) | (f/2) | f/1 |
| 03 SPECIAL PRINTING | | +1 | +1 |
| >LONGITUDINAL PRINTING | INVALID | VALID | VALID |
| >REVERSE PRINTING | INVALID | VALID | VALID |
| >2D BARCODE | INVALID | INVALID | VALID |
| >PRINT PITCH | INVALID | INVALID | VALID |
| 04 PRINT DATA | | | |
| >DATA SIZE | 48 | 150 | 2000 |
| >DATA LENGTH | 120 | 240 | 1000 |
| 05 CALENDER/COUNT | | | |
| >NUMBER OF CALENDARS | 2 | 8 | |
| >SHIFT CODE | INVALID | VALID | |
| >TIME COUNT | INVALID | VALID | |
| >CALENDAR CONVERSION | 48 | 99 | |
| >COUNTER VALUE | 2 | 8 | |

NUMBER OF UPGRADABLE PHASES    0/4

Cancel

| FUNCTION SELECTION SCREEN | | | |
|---|---|---|---|
| 01 NUMBER OF PRINT ROWS | TWO ROW | THREE ROWS | FOUR ROWS |
| 02 PRINTING SPEED | | | |
| >ONE ROW | f/2 | f/1 | f/1 |
| >TWO ROWS | f/2 | f/1.5 | f/1 |
| >THREE ROWS | (f/2) | f/1.66 | f/1 |
| >FOUR ROWS | (f/3) | (f/2) | f/1 |
| 03 SPECIAL PRINTING | | | |
| >LONGITUDINAL PRINTING | INVALID | VALID | VALID |
| >REVERSE PRINTING | INVALID | VALID | VALID |
| >2D BARCODE | INVALID | INVALID | VALID |
| >PRINT PITCH | INVALID | INVALID | VALID |
| 04 PRINT DATA | | +1 | +1 |
| >DATA SIZE | 48 | 150 | 2000 |
| >DATA LENGTH | 120 | 240 | 1000 |
| 05 CALENDER/COUNT | | +1 | |
| >NUMBER OF CALENDARS | 2 | 8 | |
| >SHIFT CODE | INVALID | VALID | |
| >TIME COUNT | INVALID | VALID | |
| >CALENDAR CONVERSION | 48 | 99 | |
| >COUNTER VALUE | 2 | 8 | |

NUMBER OF UPGRADABLE PHASES   0/9

Cancel

CONVEYANCE DIRECTION

A B C

CONVEYANCE
DIRECTION

ABC ⱯBC ABC

INKJET RECORDING APPARATUS

BACKGROUND OF THE INVENTION (1) Field of the Invention

The present invention relates to an inkjet recording apparatus that can be realized through user's selection of a function necessary for the inkjet recording apparatus.

(2) Description of the Related Art

In the case of performing printing onto a printing material by using an inkjet recording apparatus, a user of the inkjet recording apparatus selects functions necessary for the inkjet recording apparatus being used depending upon, for example, the type and quantity of the printing material or the contents of prints. However, desires of the user are variably ranged, so that it cannot be ensured that an inkjet recording apparatus meeting desires of the user can always be obtained. Ordinarily, in order to satisfy various desires of customers, a manufacturer responsively provides several types of lineups of inkjet recording apparatuses as, for example, popular models, high speed models, highly functional models. User's desires include a desire for barcode printing. In this regard, Japanese Unexamined Patent Application Publication No. 2005-199432 discloses an inkjet recording apparatus that accomplishes barcode printing.

SUMMARY OF THE INVENTION

However, depending on the case, a model having only functions a user desires is not found in a lineup of inkjet recording apparatuses. In such a case, in order to obtain the inkjet recording apparatus having only the functions the user desires, the user has to purchase an inkjet recording apparatus having one-rank higher functions even including non-desired functions, at a higher price.

Further, when changing built-in programs in units of the model, a processing step for writing the programs in units of mode in the manufacturing process has to be added. In this case, it can be considered that, when the number of models is increased, the management becomes complex to the extent of increasing the number of troubles.

In view of the above, an object of the present invention is to provide an inkjet recording apparatus. The apparatus is characterized in that no changes are made in event of delivery in the configuration of the apparatus and programs stored in an internal memory unit of the apparatus, and functions to be implemented are flexibly selectable corresponding to desires of a user of the apparatus in the event of installation thereof.

To this end, according to one embodiment of the present invention, there is provided an inkjet recording apparatus including a nozzle that atomizes a supplied ink into ink particles by exciting and ejecting the supplied ink; a charging electrode that electrically charges the ink particles; a deflecting electrode that forms an electric field that deflects the ink particles electrically charged; a storage device storing therein a program(s) that implements a predetermined printing function(s); and an authentication device. The predetermined printing function(s) becomes executable upon connection of an authentication key to the authentication device.

Further, it is preferable that, in the case where the authentication key has validity, the predetermined printing function(s) becomes executable.

Further, it is preferable that a plurality of authentication keys are connectable, and the number of executable printing functions is increased corresponding to the number of connected authentication keys.

Further, it is preferable that, in the case where a plurality of authentication keys are connected, validity of one of the plurality of authentication keys is authenticated, and another one of the plurality of authentication keys is authenticated, a printing function corresponding to the authenticated authentication keys becomes usable.

Further, it is preferable that, in the case where a plurality of authentication keys are connected, and validity of one of the plurality of authentication keys is not authenticated, the state enters a printing-disabled state.

According to the above-described, no changes are made in the event of delivery in the configuration of the apparatus and programs stored in an internal memory unit of the apparatus, and functions to be implemented are flexibly selectable corresponding to desires of a user of the apparatus in the event of installation thereof. Consequently, an inkjet recording apparatus including only user-desired functions can be provided without causing management in manufacturing processes to be complex.

BRIEF DESCRIPTION OF THE DRAWINGS

These and other features, objects and advantages of the present invention will become more apparent from the following description when taken in conjunction with the accompanying drawings wherein:

FIG. 2 is a view showing an example display of a function selection screen according to the embodiment.

FIG. 3 is a view showing example functional selections on the function selection screen according to the embodiment (in the event where the quantity (number) of authentication keys is 1);

FIG. 4 is a view showing example functional selections on the function selection screen according to the embodiment (in the event where the quantity of authentication keys is two);

FIG. 5 is a view showing example functional selections on the function selection screen according to the embodiment (in the event where the quantity of authentication keys is three);

FIG. 6 is a view showing a print example of a longitudinal print according to the embodiment;

DETAILED DESCRIPTION OF THE PREFERRED EMBODIMENT

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

One embodiment of the present invention will be described below with reference to the accompanying drawings.

An inkjet recording apparatus of one embodiment of the present invention will be described herebelow with reference to the accompanying drawings.

Figure 1:
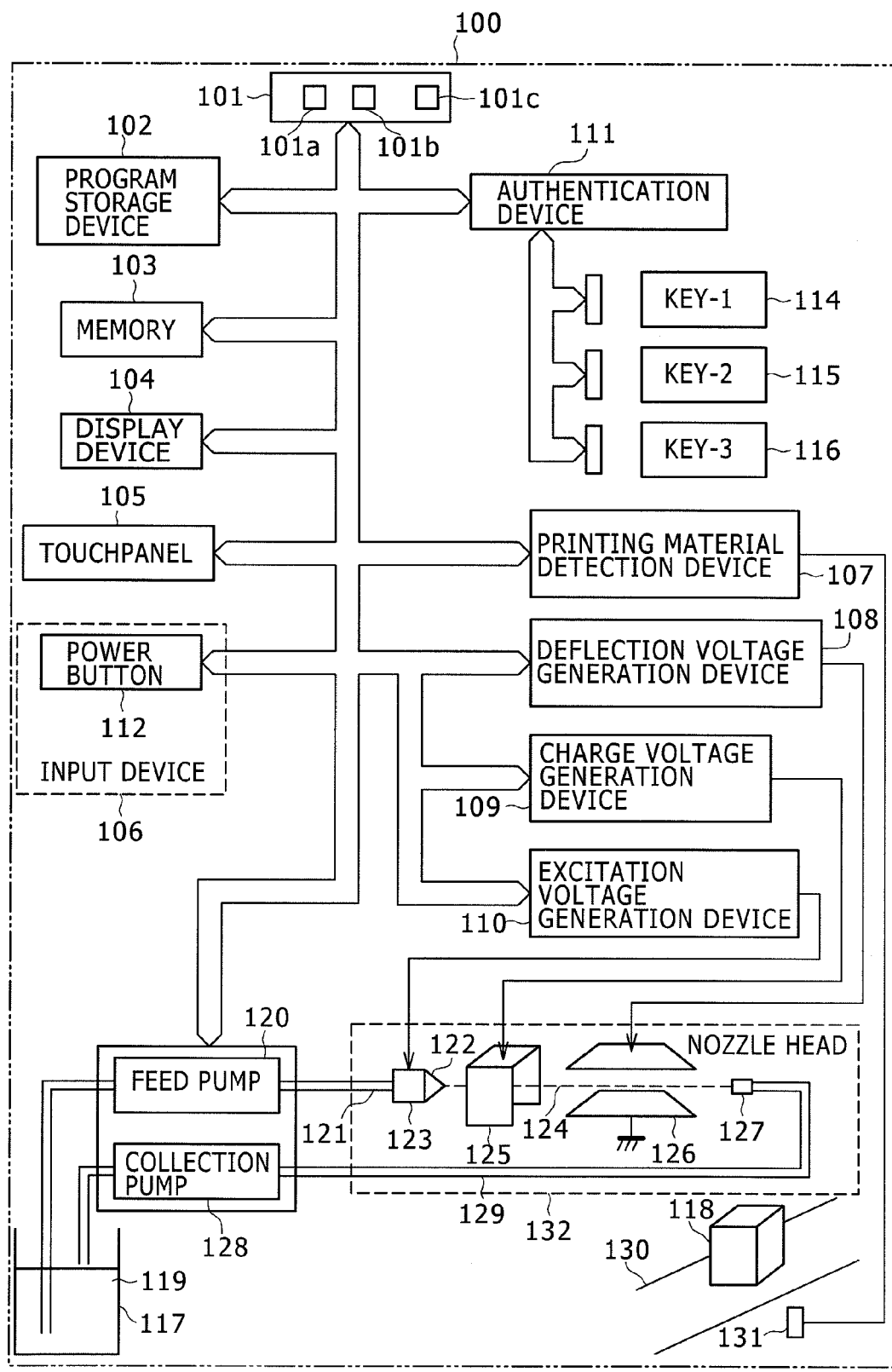
FIG. 1 is a functional block diagram of an inkjet recording apparatus of one embodiment of the present invention.

The configuration and process of an inkjet recording apparatus 100 of the present embodiment of the present invention will be described herebelow with reference to FIG. 1. FIG. 1 is a block diagram showing the configuration of the inkjet recording apparatus 100 of the present embodiment of the present invention.

With reference to FIG. 1, the control device 101 provides total control of the inkjet recording apparatus 100, and is configured from, for example, a CPU (central processing unit). The control device 101 is connected to various devices through a bus. The devices includes a program storage device 102, a memory 103, a display device 104, a touchpanel 105, an input device 106, a printing material detection device 107, a deflection voltage generation device 108, a charge voltage generation device 109, an excitation voltage generation device 110, an authentication device 111, a feed pump 120, and a collection pump 128.

The program storage device 102 is a device that preliminarily stores therein programs and data. The programs and data include programs that are executed in the control device 101, and data necessary for the process of the inkjet recording apparatus 100 and display data.

The memory 103 is used by being divided into a program execution area and a data storage area. The program execution area is an area for the execution of a program stored in the program storage device 102 and invoked by the control device 101. The data storage area is an area that stores data created by a user.

The display device 104 is a device that converts display data, which is stored in the program storage device 102, into a format for display, and displays the converted data. Viewing a screen displayed on the display device 104, the user recognizes, for example, the status of the inkjet recording apparatus 100.

The touchpanel 105 is overlaid and disposed on the display device 104, and is a device that outputs a voltage value corresponding to a touched position when the user has touched the surface of touchpanel 105. The control device 101 reads the voltage value, thereby to detect a positional coordinate the touched position. When the user touches an icon, button, or the like displayed on the display device 104, the control device 101 determines the input of the user in accordance with the positional coordinate of the touched position. Then, a program corresponding thereto is invoked from the program storage device 102 and is then executed.

The input device 106 is an operative portion that the user uses when operating the inkjet recording apparatus 100. The input device 106 is configured from a power button 112 that is used for the on/off switching of the power of the inkjet recording apparatus 100. When the power button 112 is depressed by the user, the control device 101 invokes a program corresponding to the input of the user from the program storage device 102, and executes the program.

While only the power button is shown for the input device 106 is shown in FIG. 1, the number of buttons is not limited thereby. Depending on the necessity, a keyboard and tenkeys can be mounted to allow inputting of numerals and characters.

The authentication device 111 is a device that performs authentication processing between itself and a respective one of authentication keys 114 to 116 in accordance with an instruction received from the control device 101. The authentication device 111 performs the authentication processing, thereby to determine the validity of the respective one of authentication key 114 to 116. The authentication device 111 includes connector devices for connection between the respective authentication keys 114 and 116 and the body of the inkjet recording apparatus 100, thereby enabling mounting and removal therebetween.

While FIG. 1 shows the configuration in which the number of authentication keys is three, the number of authentication keys is not limited thereto. Further, depending on the necessity, the connection devices between the inkjet recording apparatus 100 and the respective one of the authentication keys 114 to 116 may be a connector, such as a universal serial bus (USB) or card.

An ink tank 117 is a device that stores therein an ink 119 that is used for printing onto a printing material 118. The ink 119 in the ink tank 117 is pressurized by the feed pump 120 that operates in accordance with an instruction received from of the control device 101, and is thereby supplied or fed to a nozzle 122 through an ink feed pipe 121.

The nozzle 122 is a device that ejects the ink 119 fed from the ink tank 117. Further, the nozzle 122 is equipped with a piezoelectric device 123 that converts an electric signal to a mechanical signal. In response to the application of an excitation voltage signal generated by the excitation voltage generation device 110 to the piezoelectric device 123, the ink 119 ejected from the nozzle 122 is formed to ink particles 124.

The ink particles 124 thus ejected passes through a U-shaped charging electrode 125. A charge signal corresponding to printing character information generated by the charge voltage generation device 109 is applied to the charging electrode 125. The ink particles 124 are charged in accordance with the charge signal applied in the event of passing through the charging electrode 125.

Further, the ink particles 124 passed through the charging electrode 125 further pass through a deflecting electrode 126. A deflection voltage for deflecting the charged ink particles 124, which has been generated by the deflection voltage generation device 108, is applied to the deflecting electrode 126. The ink particles 124 are deflected corresponding to the amount of charge when passing through a deflection electric field formed by the deflection voltage. Then, the deflected ink particles 124 are printed onto the printing material 118.

An ink collection opening 127 is used to collect uncharged ink particles 124. The ink particles 124 collected by the ink collection opening 127 are pressurized by the collection pump 128 that operates in accordance with an instruction received from the control device 101. Thereby, the ink particles 124 are passed through an ink collection pipe 129, and are then returned into the ink tank 117.

A conveyor 130 is a device that conveys, at a predetermined speed, the printing material 118 that will be printed by the inkjet recording apparatus 100. A conveyance direction of the printing material 118 is a direction perpendicular to the deflection direction of the ink particles 124.

A printing material sensor 131 is a device that detects the printing material 118 conveyed by the conveyor 130. Upon detection of a printing material 118, the printing material sensor 131 sends a printing material detection signal to the printing material detection device 107.

The printing material detection device 107 is a device that sends the printing material detection signal, which has been sent from the printing material sensor 131, to the control device 101. Upon receipt of the printing material detection signal, the printing material detection device 107 detects that a printing material 118 has arrived in a printing area of the inkjet recording apparatus 100.

The inkjet recording apparatus 100 of the present embodiment includes in the body's interior, a control circuit board that includes the functions of the blocks of components shown in FIG. 1 in the interior of the body. The components are the control device 101, the program storage device 102, the memory 103, the authentication device 111, the authentication key connector devices, the printing material detection device 107, the deflection voltage generation device 108, the charge voltage generation device 109, and the excitation voltage generation device 110. In the configuration, the authentication keys 114 to 116 are mounted to the respective authentication key connector devices. The upper portion of the body of configuration includes the display device 104 and a display device integrated with a touchpanel display device including the touchpanel 105 overlaid on the surface of the display device 104, and the power button 112. The exterior portion of the body of the configuration includes the printing material sensor 131 connected to the printing material detection device 107. The lower portion of the body of the configuration includes the ink tank 117 filled with the ink 119, the feed pump 120, and the collection pump 128. The lower portion of the body further includes a nozzle head 132 connected via signal lines to the body of the inkjet recording apparatus 100, the ink feed pipe 121, the ink collection pipe 129, the deflection voltage generation device 108, the charge voltage generation device 109, and the excitation voltage generation device 110. The nozzle head 132 includes the nozzle 122, the piezoelectric device 123, the charging electrode 125, the deflecting electrode 126, and the ink collection opening 127.

Next, the process of the inkjet recording apparatus 100 will be described herebelow.

FIG. 2 is a view showing a function selection screen 200 displayed on the display device 104 for functions implementable by the control device 101 in the inkjet recording apparatus 100.

More specifically, FIG. 2 shows an example in which functions titled "Number of Print Rows," "Printing Speed," "Special Printing," "Print Data," and "Calendar/Count" can be upgraded by two or three phases.

"Number of Print Rows" specifies the number of rows of characters for printing in the inkjet recording apparatus 100. The entry allows specification of any one of two, three, and four rows.

The "Printing Speed" specifies the speed of printing in the inkjet recording apparatus 100. The character "f" indicated in the entry "Printing Speed" of the function selection screen 200 represents the frequency of the excitation voltage signal to be applied to the piezoelectric device 123 to form the ink 119 into the ink particles 124. The frequency is referred to as "excitation frequency," hereinbelow. As the excitation frequency is higher, the number of ink particles to be used for printing increases, and the printing speed of the inkjet recording apparatus 100 increases. The value "f/2" specified for the "Printing Speed" of the function selection screen 200 is indicative of ½ of the excitation frequency. More specifically, the value indicates that, among the ink particles 124 to be ejected from the nozzle 122, one out of every two particles is used for printing. Ink particles 124 unused for printing are collected through the ink collection opening 127.

"Special Printing" specifies special printing to be performed in the inkjet recording apparatus 100. "Longitudinal Printing" specifies a function that prints characters along the longitudinal direction with respect to the conveyance direction of the printing material 118 conveyed by the conveyor 130, as shown in FIG. 6.

Figure 7:
FIG. 7 is a view showing a print example of a reverse print according to the embodiment.

"Reverse Printing" specifies a function that, as shown in FIG. 7, prints characters along a transverse direction with respect to the conveyance direction of the printing material 118 conveyed by the conveyor 130, and concurrently prints the characters while repeating erect state printing and reversed state printing in units of a the character.

"2D Barcode" specifies a function that prints a two-dimensional code.

"Print Pitch" specifies a function corresponding to printing in the case where the printing material 118 is conveyed by the conveyor 130 at high frequency.

When the respective entry of the function corresponding to "valid" is selected, the function can be implemented.

"Print Data" relates to specification of print data.

"Data Size" indicates a maximum number of pieces of print data that can be stored or registered in the inkjet recording apparatus 100. More specifically, any one of the numbers 48, 150, and 150-2000 can be selected. Respective print data is stored in the memory 103, and can be called when necessary.

"Data Length" indicates a maximum number of characters of one piece of print data. Any one of the numbers 120, 240, and 1000 can be selected.

"Calendar/Count" specifies a function that prints a calendar (year, month, date, hour, minute, and second) corresponding to the present time and a function that performs printing by counting up or down in units of an operation of printing of characters in a specified item.

"Number of Calendars" specifies the number of registerable calendars.

"Shift Code" corresponds to a function that divides one day to a number of operation shifts and that prints a code different in units of the respective operation shift. This function is used in such a case where, for example, the time periods from 0:00 to 07:59, from 08:00 to 15:59, and from 16:00 to 23:59 are printed as codes "A1," "A2," and "A3," respectively.

"Time Count" corresponds to a function that updates the print contents at a predetermined update time interval. This function is used in such a case where, for example, the print contents are updated as A to Z and printed.

"Calendar Conversion" corresponds to a function that replaces the date/time on the calendar with specified characters and prints it. This function is used in such a case where, for example, the time periods from 00 to 11 hours and from 12 to 23 hours are replaced with "AM" and "PM" and printed.

"Number of Counters" specifies the number of registerable counters.

The respective functions "Shift Code" and "Time Count" can be implemented when the respective items indicating "valid" are selected.

Suppose that the user of the inkjet recording apparatus 100 has not upgraded the functions, the inkjet the functions to be implemented in the recording apparatus 100 (or "implementation functions of the excitation voltage generation device 110," herebelow) are set to the state where the respective leftmost fields in the function selection screen 200 are colored. This indicates that the respective functions are in the states of default functions of the inkjet recording apparatus 100.

A method of selecting a function(s) to be implemented by the user of the inkjet recording apparatus 100 during installation will be described herebelow with reference to FIGS. 1 to 5.

FIGS. 3 to 5 are views respectively showing examples of function selection on the function selection screen 200 in the event that the number of authentication keys successful in authentication is different.

The user of the inkjet recording apparatus 100 uses the touchpanel 105 and selects thereon desired implementation functions of the inkjet recording apparatus 100 from the function selection screen 200 displayed on the display device 104. The control device 101 includes therein a function selection memory 101a to implement the functions selected by the user of inkjet recording apparatus 100 from the function selection screen 200. The control device 101 retains information indicative whether specific functions of the inkjet recording apparatus 100 are valid or invalid.

Upon selection of the desired implementation functions by the user, the control device 101 registers information of the selected functions into the function selection memory 101a. The program storage device 102 contains preliminarily stored programs that implement the functions displayed on the function selection screen 200. The control device 101 invokes a program that implements specific functions from the program storage device 102 by reference to the information in the function selection memory 101a and executes the program.

The program execution by the control device 101 enables the user of the inkjet recording apparatus 100 to use the functions selected from the function selection screen 200. Further, in the case where the user of the inkjet recording apparatus 100 verifies the selected functions by using the touchpanel 105, the control device 101 accesses and references the function selection memory 101a. Thereby, the control device 101 controls the display device 104 to display a list of functions presently set in valid/invalid states in the inkjet recording apparatus 100.

A method of specifying the number of functions that can be implemented by the user of the inkjet recording apparatus 100 in the event of installation will be described hereblow with reference to FIG. 1.

The inkjet recording apparatus 100 includes in the body thereof, the connector devices for mounting the authentication keys 114 to 116, in which the authentication keys 114 to 116 can be mounted and removed. Authentication processing is executable between the respective authentication keys 114 to 116 mounted and the authentication device 111. The number of functions implementable in the inkjet recording apparatus 100 can be specified corresponding to the number of authentication keys successfully authenticated. The authentication processing to be executed between the authentication device 111 and the respective authentication keys 114 to 116 is executed through comparison between authentication codes generated by the authentication device 111 and the respective authentication keys 114 to 116. An authentication algorithm employed in the authentication processing has a feature in that an input value for input into the authentication algorithm cannot be obtained from an authentication code generated by the authentication algorithm, and multiple inputs for the same authentication code are not present.

The present embodiment will be described regarding the case where the respective authentication keys 114 to 116 can be mounted to the body of the inkjet recording apparatus 100.

When the control device 101 issues an instruction to execute authentication processing between the authentication device 111 and the respective one of the authentication keys 114 to 116 mounted to the authentication device 111, the authentication processing is started in response.

Upon start of the authentication processing, the authentication device 111 first causes generating random numbers, and transmits the generated random numbers to the respective authentication keys 114 to 116. Further, the authentication device 111 and the authentication keys 114 to 116 retain common codes in internal memory areas for use in authentication, in which the internal memory areas are not readable from the outside. The authentication device 111 inputs thereinto the random numbers, which have been generated by the authentication algorithm, and the codes retained in the internal memory area of the authentication device 111, and generates authentication codes. The authentication device 111 further issues instructions to the respective mounted authentication keys 114 to 116 to generate authentication codes in accordance with the codes from the random numbers, which have been transmitted to the authentication algorithm from the authentication device 111, and the codes retained in the internal memory areas of the authentication keys 114 to 116.

The authentication keys 114 to 116 respectively generate authentication codes and transmit the generated authentication codes to the authentication device 111. The authentication device 111 performs a comparison between the authentication code generated in the authentication device 111 and the authentication code transmitted from the respective one of the authentication keys 114 to 116. As a consequence, only when the authentication codes are identical to one another, it is determined that authentication is successful. The authentication device 111 performs similar authentication processing on the respective one of all the other mounted authentication keys, and performs determination for the authentication thereof.

Upon completion of authentication processing with all the authentication keys 114 to 116, the authentication device 111 sends, as a result of authentication, the quantity (number of) of authentication keys successfully authenticated in the authentication processing to the control device 101. The control device 101 includes therein an authentication key quantity memory 101b that retains the quantity of successfully authenticated authentication keys. The control device 101 registers (stores) the quantity of successfully authenticated authentication keys into the authentication key quantity memory 101b.

The control device 101 further includes therein a conversion table 101c of the quantity of successfully authenticated authentication keys and the number of phases allowing the user of the inkjet recording apparatus 100 to upgrade the functions of the inkjet recording apparatus 100. The control device 101 references the authentication key quantity memory 101b and the conversion table 101c, thereby to specify the number of phases allowing upgrade in accordance with the quantity of presently mounted and successfully authenticated authentication keys. The conversion table 101c contains specifications of the numbers of upgradable phases as: zero when the number of authentication keys is zero; one when the number of authentication keys is one; four when the number of authentication keys is two; and nine when the number of authentication keys is three.

When displaying functions implementable in the inkjet recording apparatus 100 as the function selection screen 200 on the display device 104, the control device 101 displays the number of phases allowing upgrade by using the quantity of presently mounted and successfully authenticated authentication keys. Thereby, the number of phases allowing functional upgrade is notified to the user of the inkjet recording apparatus 100 by using the quantity of presently mounted and successfully authenticated authentication keys.

In FIG. 2, the number of phases allowing upgrade is shown as "Numbers of Upgradable Phases: 9/9." In this case, the denominator "9" indicates the number of phases allowing the upgrade in accordance with the quantity of presently mounted and successfully authenticated authentication keys, and the numerator "9" indicates the number of remaining functions upgradable by the user. Thereby, the user of the inkjet recording apparatus is enabled to select functions corresponding to the numbers of upgradable phases displayed on the display device 104 from the function selection screen 200.

FIG. 3 is a view showing example functional selections on the function selection screen in the instance where the quantity of successfully authenticated authentication keys is one. Since the quantity of successfully authenticated authentication keys is one, the numbers of upgradable phases is two, in which the number of print rows and the printing speed are, respectively, upgraded by one phase.

FIG. 4 is a view showing example functional selections on the function selection screen in the instance where the quantity of successfully authenticated authentication keys is two. Since the quantity of successfully authenticated authentication keys is two, the numbers of upgradable phases is four, in which, in addition to the upgrades shown in FIG. 3, the function of special printing is upgraded by two phases.

FIG. 5 is a view showing example functional selections on the function selection screen in the instance where the quantity of successfully authenticated authentication keys is three. Since the quantity of successfully authenticated authentication keys is three, the numbers of upgradable phases is four, in which, in addition to the upgrades shown in FIG. 4, the function of print data is upgraded by one phase, and the function of calendar/count is upgraded by one phase. Thereby, all the functions are upgraded to the maximum.

As shown and described above, in the present embodiment, there can be provided the inkjet recording apparatus 100 only with user-desired functions being implemented. The functions can be implemented simply in the manner that the number of phases allowing functional upgrade is specified by using the quantity of successfully authenticated authentication keys among mounted authentication keys, and only the quantity of authentication keys is changed in the event of installation.

Examples of the process of the inkjet recording apparatus 100 of the present embodiment of the present invention will be described with reference to flow diagrams.

Figure 8:
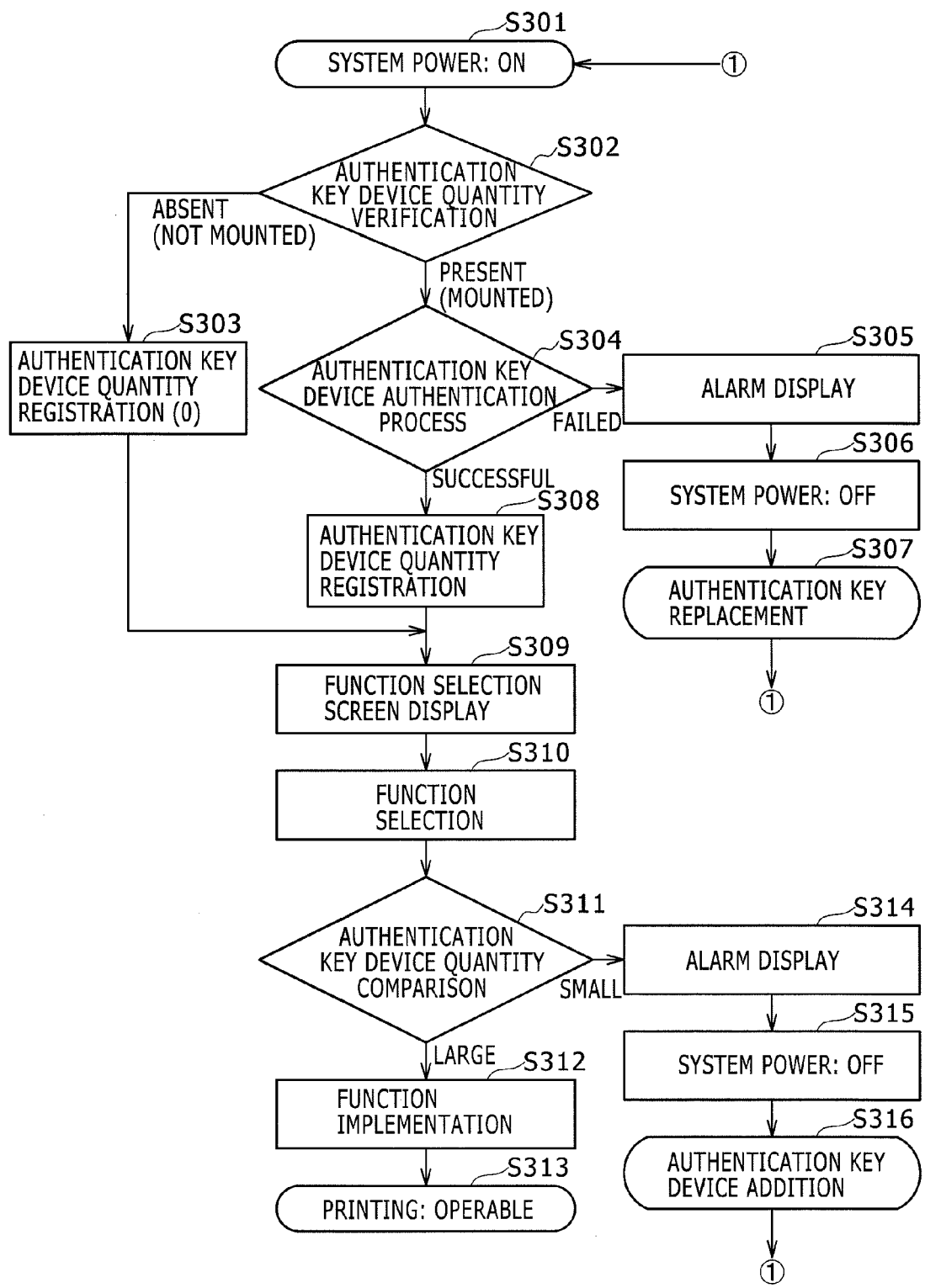
FIG. 8 is a flow diagram showing a first example of the process of the inkjet recording apparatus of the embodiment in the event of system activation.

First, examples of the process in the event of system activation will be described herebelow in accordance with flow diagrams shown in FIGS. 8 and 9.

When the user turns on the power of the inkjet recording apparatus 100 by depressing the power button 112, the process is started (step S301).

After the power is turned on and the inkjet recording apparatus 100 is activated, it is verified whether an authentication key(s) is mounted to the inkjet recording apparatus 100 (step S302)

If no authentication key is mounted to the inkjet recording apparatus 100, then it is registered (stored) into the authentication key quantity memory 101b that the quantity of authentication keys is zero (step S303). The process then proceeds to step S309.

If an authentication key(s) is mounted to the inkjet recording apparatus 100, the authentication processing is executed on respective one of all the authentication keys (step S304). In the event where an authentication key failed in authentication is present, then the instance is displayed as an alarm on the display device 104 to notify that the authentication processing of the authentication key has failed and hence the authentication key has to be replaced (step S305). After having verified the display, the power of the inkjet recording apparatus 100 is turned off (step S306). Then, the authentication-failed authentication key is replaced (step S307). Then, the user again turns on the power of the inkjet recording apparatus 100 (step S301).

If, at step S304, the authentication processing of all the mounted authentication keys authentication is successful, the quantity of the successfully authenticated authentication keys is registered into the authentication key quantity memory 101b (step S308). Then, the user causes the display device 104 to display the function selection screen 200 thereon by operating the touchpanel 105 from the operation screen displayed on the display device 104 (step S309). In this connection, the configuration may be such that specific passwords are provided for access to the function selection screen 200, and only persons knowing the respective passwords are permitted to access the function selection screen 200. Thereby, security can be improved. Further, the configuration may be such that presently valid functions are color displayed on the function selection screen 200 by referencing the function selection memory 101a. Thereby, operability for users can be improved.

Further, the configuration may be such that that the authentication key quantity memory 101b and the conversion table 101c are referenced to thereby to display the number of upgradable phases on the function selection screen 200 by using the quantity of presently mounted and successfully authenticated authentication keys.

Then, from the function selection screen 200 displayed on the display device 104 of the inkjet recording apparatus 100, the user selects implementation functions in the range to the number of upgradable phases by using the quantity of presently mounted and successfully authenticated authentication keys (step S310).

In the inkjet recording apparatus 100, by referencing the authentication key quantity memory 101b and the conversion table 101c, it is determined that the number of phases upgradable by using the quantity of presently mounted and successfully authenticated authentication keys. Further, a comparison is performed between the determined the number of phases to the number of presently valid functions registered in the function selection memory 101a (step S311).

In the event where the quantity of presently mounted and successfully authenticated authentication keys, which is stored in the authentication key quantity memory 101b, is smaller, the instance is displayed as an alarm on the display device 104 (step S314). The alarm is indicative that the quantity of the mounted authentication keys is small and hence additional authentication key have to be mounted. After the display has been verified, the power of the inkjet recording apparatus 100 is turned off (step S315). Then, an additional authentication key is mounted (step S316). After the authentication key has been added, the power of the inkjet recording apparatus 100 is turned on again (step S301).

Figure 9:
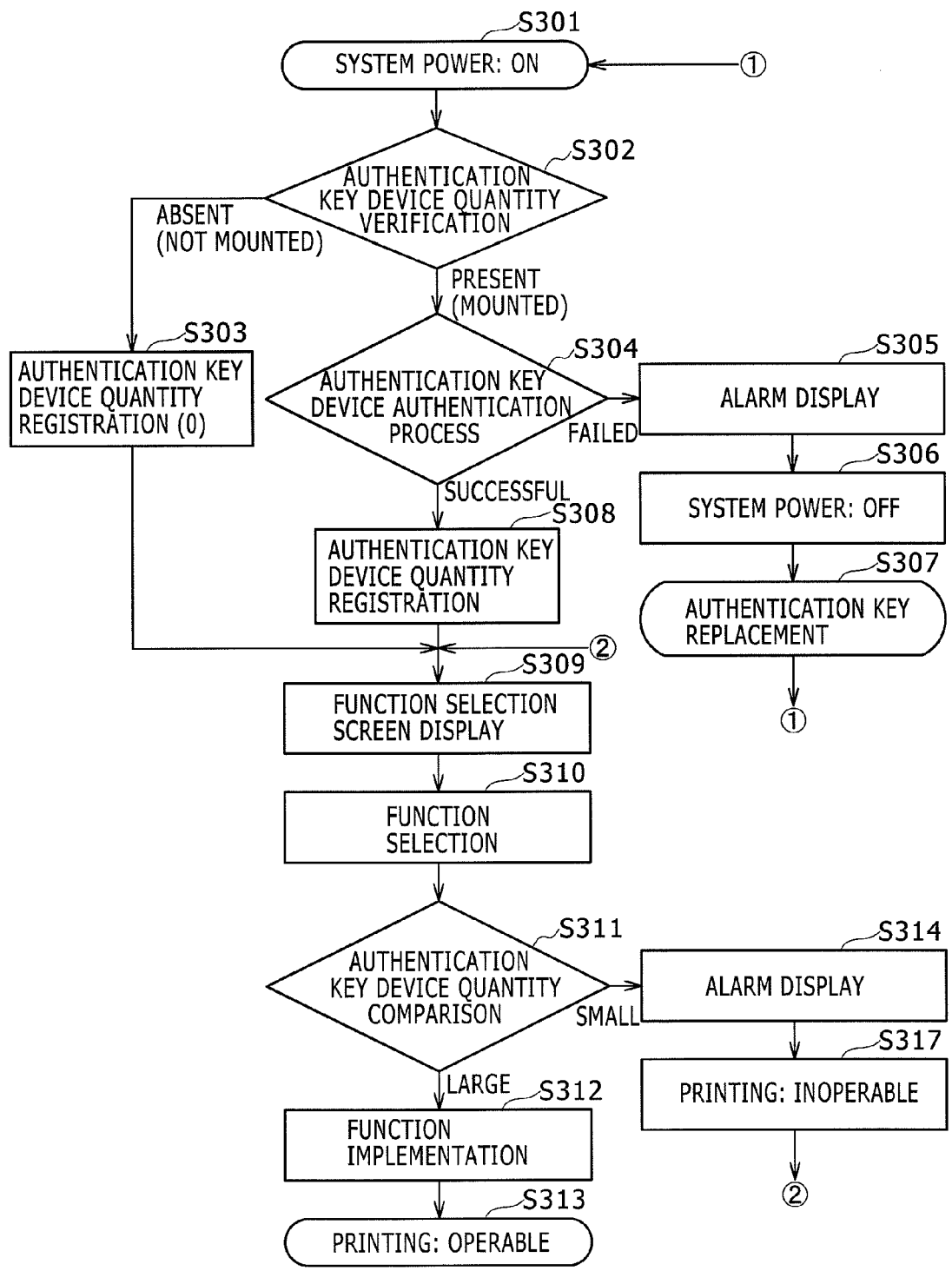
FIG. 9 is a flow diagram showing a second example of the process of the inkjet recording apparatus of the embodiment in the event of system activation.

Further, as shown in FIG. 9, the process may be such that, after the alarm has been displayed on the display device 104 (step S314), the inkjet recording apparatus 100 is shifted to a print-operation disabled state (step S317). Then, the user operates the touchpanel 105 to cause the function selection screen 200 to be displayed again (step S309), and performs function selection (step S310).

If, at step S311 of FIG. 8 or 9, the quantity of presently mounted and successfully authenticated authentication keys, which quantity is registered in the authentication key quantity memory 101b, is greater, then the inkjet recording apparatus 100 operate as follows. The function selection memory 101a is referenced, and a program for implementing selected functions selected is invoked from the program storage device 102 and executed. Thereby, the contents of the function selection memory 101a are implemented in the inkjet recording apparatus 100 (step S312).

After having implemented the contents of the function selection memory 101a, the inkjet recording apparatus 100 shifts to a print-operation enabled state (step S313).

After having shifted to the print-operation enabled state, the operation screen dedicated for the inkjet recording apparatus 100 is displayed on the display device 104. The user of the inkjet recording apparatus 100 operates the operation screen displayed on the display device 104 by using the touchpanel 105, thereby to be able to perform operation such as printing.

Next, examples of the operation of periodical monitoring of the authentication keys, which is periodically performed by the inkjet recording apparatus 100, will be described in accordance with flow diagrams shown in FIGS. 10 to 12.

During the state where the power of the inkjet recording apparatus 100 is on, the inkjet recording apparatus 100 periodically executes the authentication processing with the authentication keys (step S501).

The inkjet recording apparatus 100 verifies the number of authentication keys mounted thereto (step S502).

If no authentication key is mounted to the inkjet recording apparatus 100, information indicative that the quantity of authentication keys is zero is stored into the authentication key quantity memory 101b (step S503). Then, the process proceeds to step S509.

If an authentication key(s) is mounted to the inkjet recording apparatus 100, the authentication processing is executed on respective one of all the authentication keys (step S504). In the event where an authentication key failed in authentication is present, then the instance is displayed as an alarm on the display device 104 to notify that the authentication processing of the authentication key has hailed and hence the authentication key has to be replaced (step S505). After having verified the display, the power of the inkjet recording apparatus 100 is turned off (step S506). Then, the authentication-failed authentication key is replaced (step S507). After the replacement of the authentication key, the process proceeds to step S301 shown in FIG. 8, at which the user of the inkjet recording apparatus 100 turns on the power. In response, the process in the event of system activation is executed from step S301.

If, at step S504, the authentication processing of all the mounted authentication keys authentication is successful, then the quantity of the successfully authenticated authentication keys is stored (registered) into the authentication key quantity memory 101b (step S508). Then, the process proceeds to step S509.

In the inkjet recording apparatus 100, upon registration of the quantity of the successfully authenticated authentication keys into the authentication key quantity memory 101b, the number of phases upgradable by using the quantity of presently mounted and successfully authenticated authentication keys by referencing the authentication key quantity memory 101b and the conversion table 101c. Further, a comparison thereof to the number of presently valid functions stored in the function selection memory 101a is performed (step S509).

In the event where the quantity of presently mounted and successfully authenticated authentication keys, which is stored in the authentication key quantity memory 101b, is smaller, the instance is displayed as an alarm on the display device 104 (step S510). The alarm is indicative that the quantity of the mounted authentication keys is small and hence additional authentication key have to be mounted. After having verified the display, the power of the inkjet recording apparatus 100 is turned (step S511). Then, an additional authentication key is mounted (step S512). After the additional authentication key has been mounted, the process proceeds to step S301 shown in FIG. 8. At step S301, the power of the inkjet recording apparatus 100 is turned on. In response, the process in the event of system activation is executed.

Figure 11:
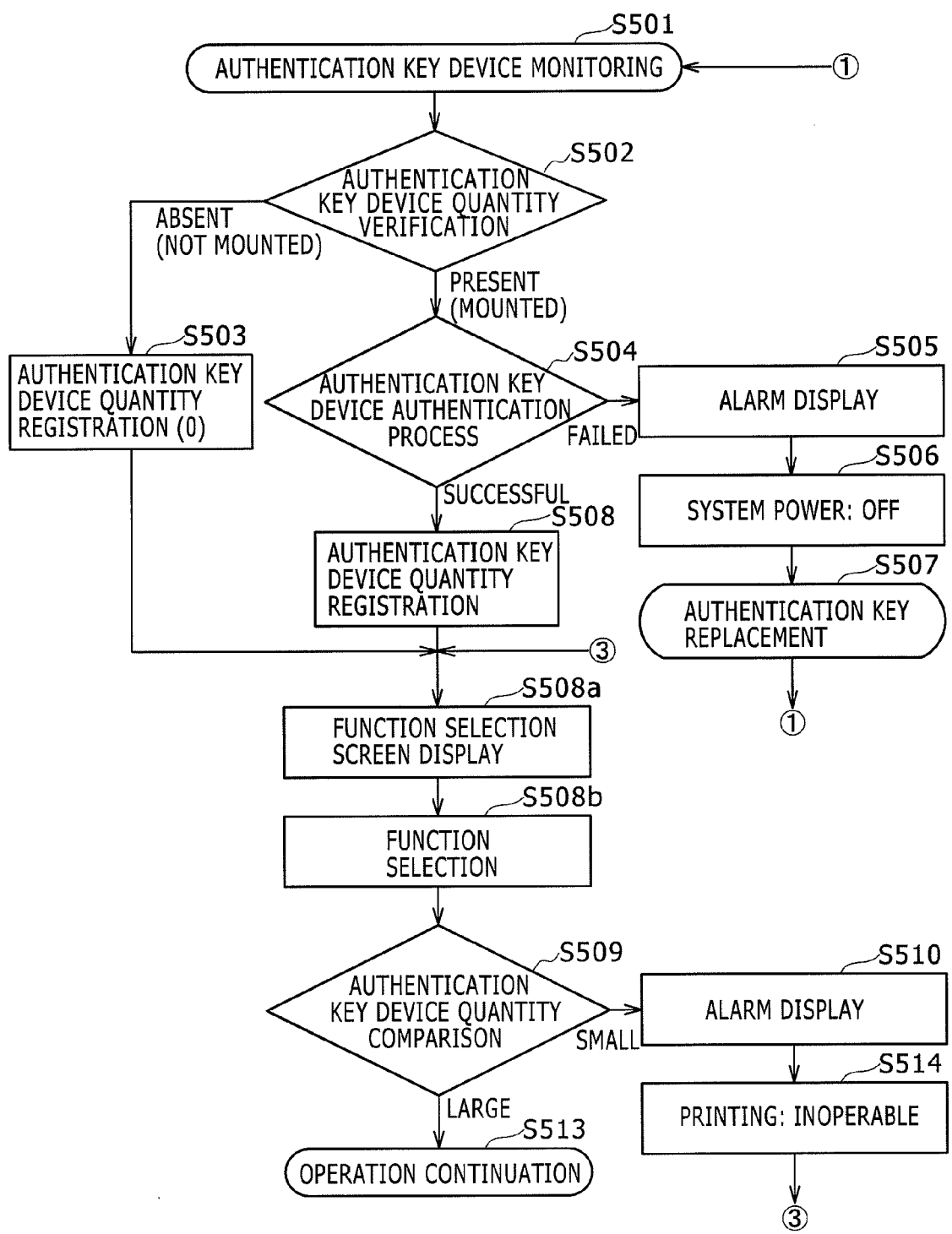
FIG. 11 is a flow diagram showing a second example of the process of periodical monitoring of the authentication key device of the inkjet recording apparatus of the embodiment.

Further, as shown in FIG. 11, the operation may be such that, after the alarm has been displayed on the display device 104 (step S510), the inkjet recording apparatus 100 is shifted to a print-operation disabled state (step S514). Then, the user operates the touchpanel 105 to cause the function selection screen 200 to be displayed again (step S508a) and performs function selection (step S508), and then the process proceeds to step S509.

Figure 12:
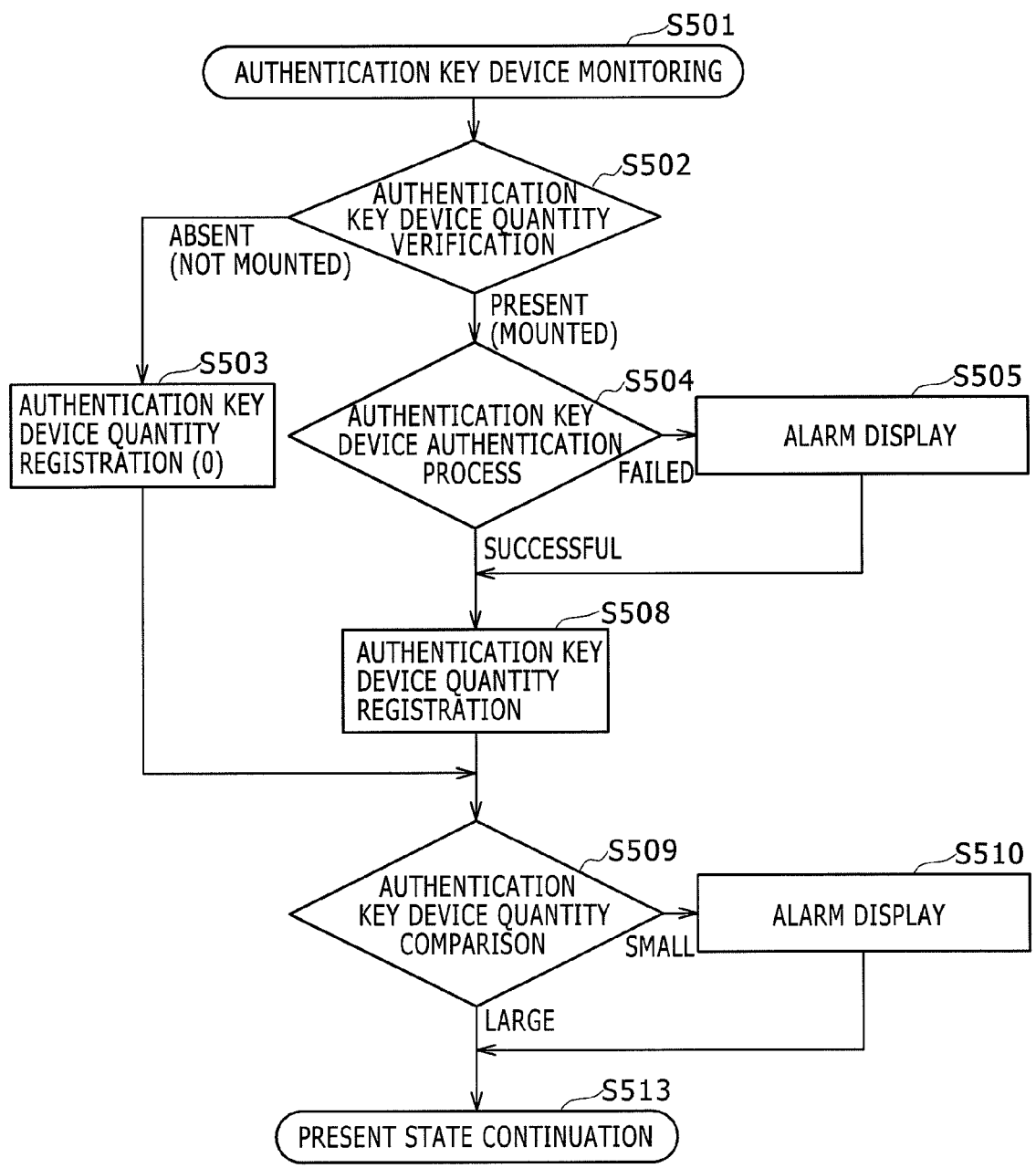
FIG. 12 is a flow diagram showing a third example of the operation of periodical monitoring of the authentication key device of the inkjet recording apparatus of the embodiment.

Further, the operation may be such that, as shown in FIG. 12, only the alarm is displayed on the display device 104, and the present or current state is continued.

Figure 10:
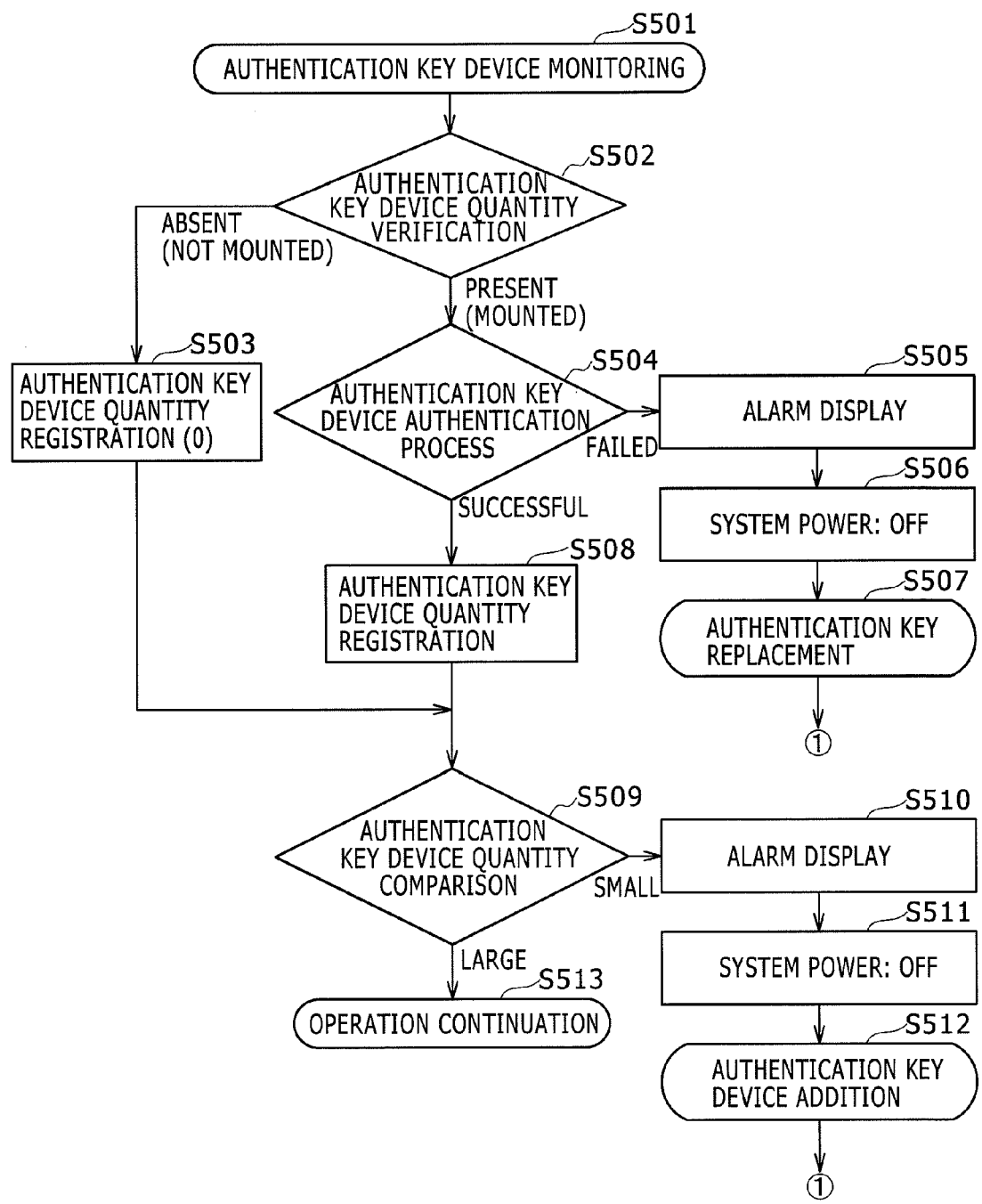
FIG. 10 is a flow diagram showing a first example of the process of periodical monitoring of an authentication key device of the inkjet recording apparatus of the embodiment.

If, at step S509 of FIG. 10, the quantity of presently mounted and successfully authenticated authentication keys, which quantity is registered in the authentication key quantity memory 101b, is greater, then the periodical monitoring of authentication keys in the inkjet recording apparatus 100 terminates. Then, processing continues operation with the contents of the function selection memory 101a (step S513).

While the example configurations of and examples of the process of the inkjet recording apparatus of the present invention have been shown and described as above, the embodiment and the examples should not limit the present invention, and are not limited to the above-described contents unless the spirit and scope of the present invention are changed.

INDUSTRIAL APPLICABILITY

In the case where the present invention is applied to an inkjet recording apparatus operating in response to a large variety of desires of a user, the user can be provided with an inkjet recording apparatus that implements only functions desired by the user.

An inkjet recording apparatus is configured to include functions selectable during installation thereof. Hence, in the event of delivery, the inkjet recording apparatus having the same configuration and same programs stored in an internal memory unit can be delivered, so that management for delivery can be simplified.

What is claimed is:
1. An inkjet recording apparatus, comprising:
a nozzle that atomizes a supplied ink into ink particles by exciting and ejecting the supplied ink;
a charging electrode that electrically charges the ink particles;
a deflecting electrode that forms an electric field that deflects the ink particles electrically charged;
a storage device storing therein a program that implements a predetermined printing function;
wherein an authentication device, to which a plurality of authentication keys are connectable, to make the predetermined printing function executable; and
a control device that is configured to increase the number of phases for which an upgrade of the predetermined printing function is allowed, in accordance with the number of the plurality of authentication keys successfully authenticated by said authentication device.
2. The inkjet recording apparatus of claim 1, wherein, in the case where the plurality of said authentication keys are con- nected, validity of one of the plurality of authentication keys is authenticated, a printing function corresponding to the authenticated authentication key becomes usable.

3. The inkjet recording apparatus of claim 1, wherein, in the case where the plurality of authentication keys are connected and validity of one of the plurality of authentication keys is not authenticated, the inkjet recording apparatus enters a printing disabled state.

* * * * *